May 8, 1928.
F. O. CONILL
MOTOR VEHICLE FRONT GLASS WIPER
Filed Jan. 9, 1926
1,669,285
3 Sheets-Sheet 1
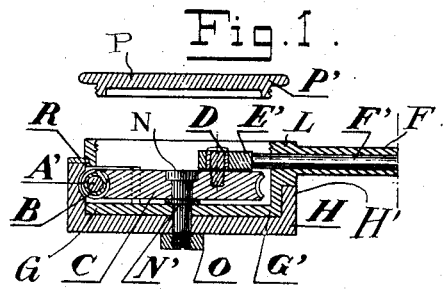
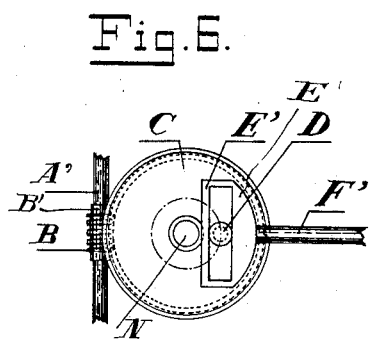
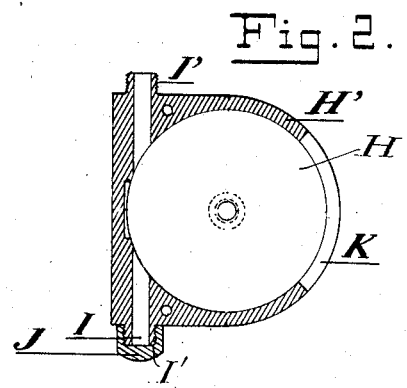
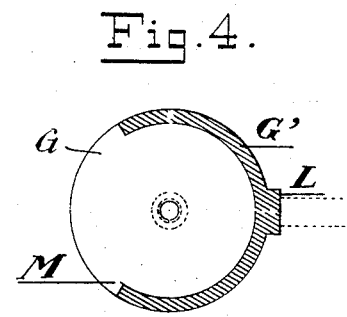
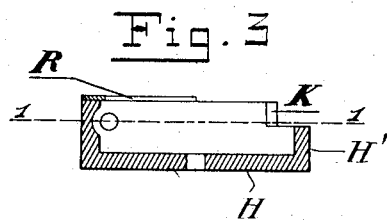
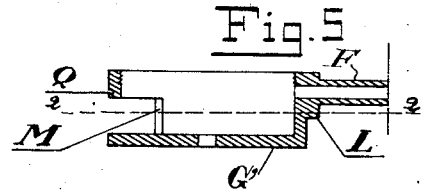
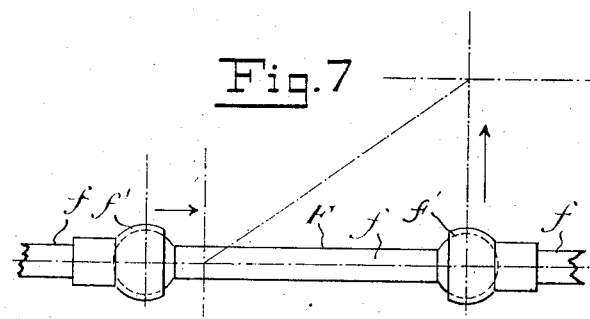
INVENTOR:
Fernand Oscar Conill
By
Chatain Company
Att'ys

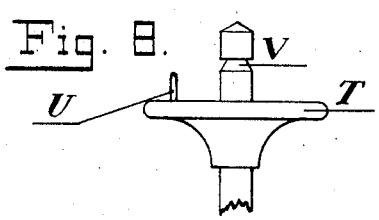
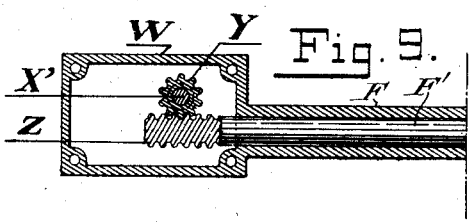
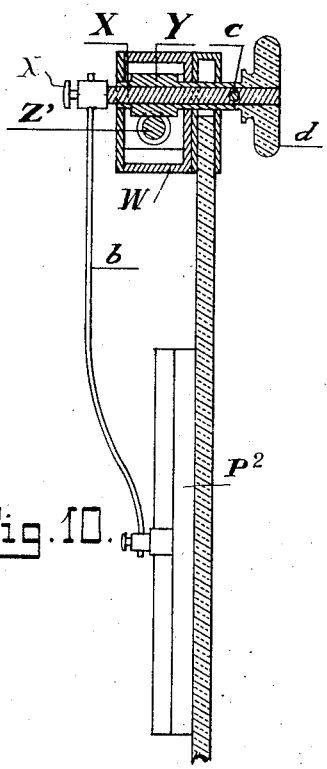
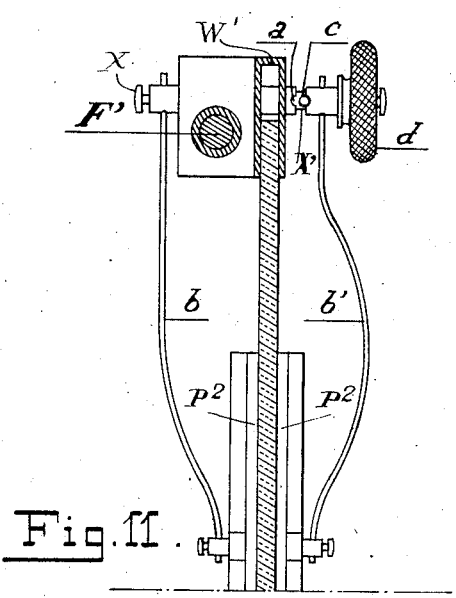
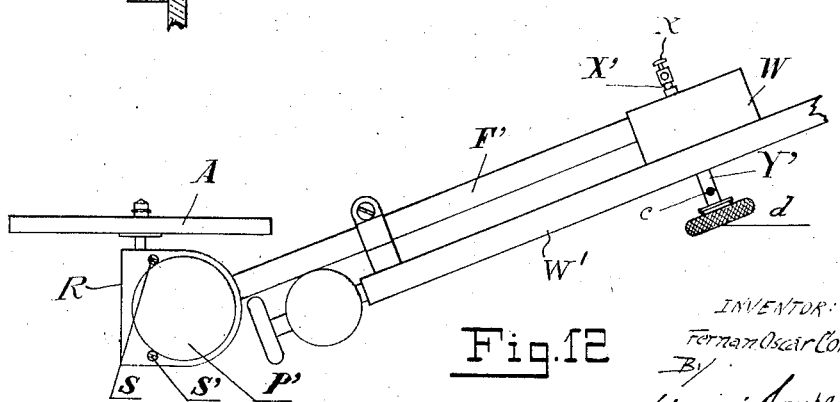

May 8, 1928.
F. O. CONILL
1,669,285
MOTOR VEHICLE FRONT GLASS WIPER
Filed Jan. 9, 1926　　　3 Sheets-Sheet 3
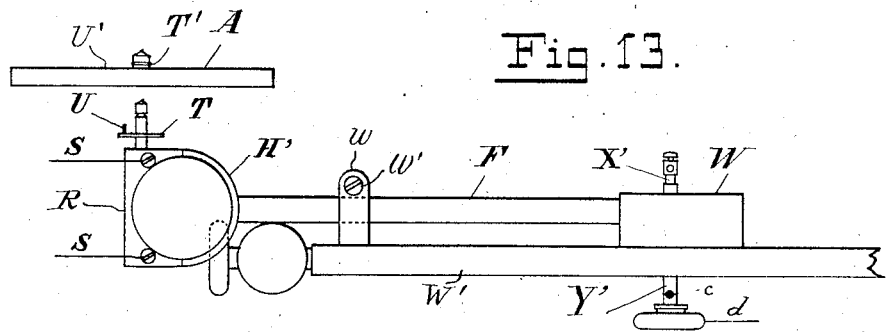
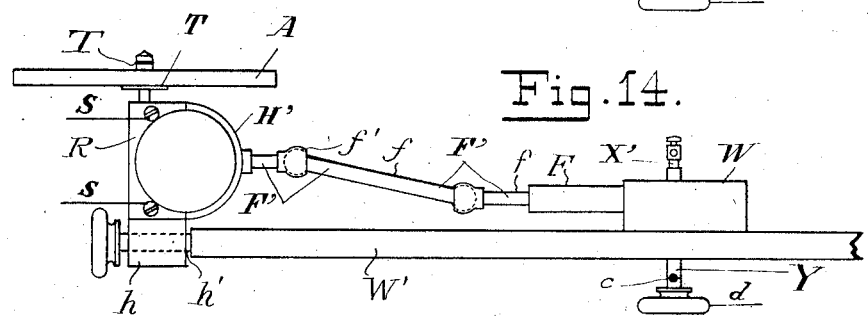
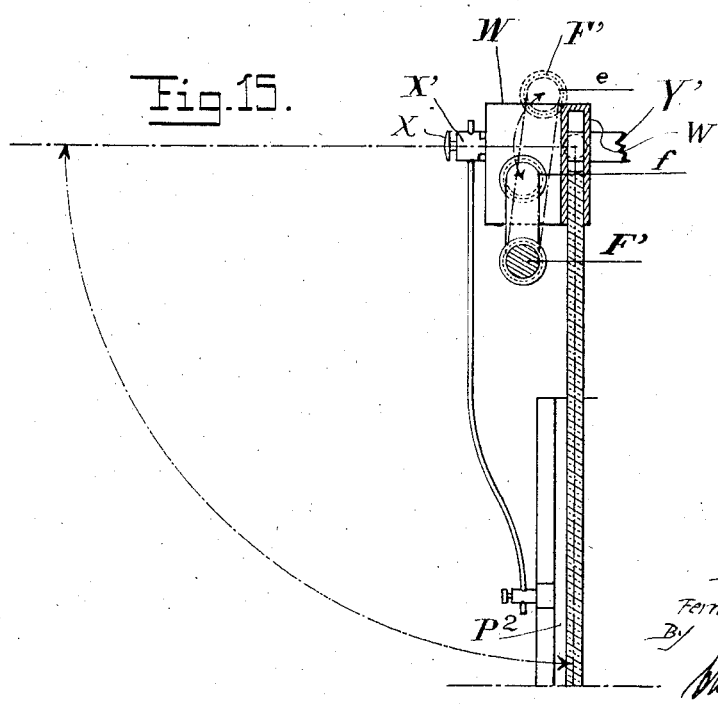

Patented May 8, 1928.

1,669,285

UNITED STATES PATENT OFFICE.

FERNAN OSCAR CONILL, OF MARSEILLE, FRANCE.

MOTOR-VEHICLE FRONT-GLASS WIPER.

Application filed January 9, 1926. Serial No. 80,375, and in France January 10, 1925.

The invention, hereinafter described, relates to mechanism actuating wipers of that type which are intended for attachment to wind-shields of automobiles and operated by wind-driven vanes which transmit motion to an oscillating pad, acting on the shield, through worm gear; the oscillating arm, by which the pad is carried, being united to the gearing by a joint which enables the arm to operate notwithstanding that the screen be opened and adjusted so as to incline at any desired angle, as is usual.

An object of this invention is to provide a particular construction of wind-shield wipers of which the operation will not be impeded by opening the screen and setting it at any desired angle; a further object of the invention being to construct the casing, in which is gearing, usually employed in such devices, in such a way that it can be easily adjusted, when secured to a wind-shield, of V-shape and of which the angles may vary on different vehicles, so as to bring the vane into correct position to meet the full force of the wind; it being also desirable in such instances, to so construct the casing that the vane-spindle can be readily adapted to project from either side thereof to enable the device to be conveniently used at either end of a wind-shield as, for instance, in the case of a V-shaped wind-shield; when it may be desirable to use a shield wiper at the outer side of each of the glass panels.

The invention therefore consists more particularly in the construction of the casing of the device and the rod which reciprocates and communicates oscillatory motion to an arm on which is the shield wiping pad, and, further, in a combination of these and other parts of mechanism as defined in the appended claiming clauses.

Reference being had to the drawings herewith:—

Figure 1, is a section through the complete gear-casing and gearing; Fig. 2, is a section, taken horizontally on the line 1—1 of Fig. 3, through a lower and outer part of the casing, and Fig. 3 is a section, taken vertically through the same part; Fig. 4, is a section, taken horizontally on the line 2—2 of Fig. 5, through an inner part of the gear casing, and Fig. 5, is a section, taken vertically through the same part; Fig. 6, is a plan of the gearing within the casing; Fig. 7 is a plan of a construction of the power reciprocal transmitting rod; Fig. 8 illustrates, in detail construction appertaining to the wind-vane spindle; Fig. 9 is a plan in section, of mechanism for converting rotary motion of the vane-shaft into reciprocating motion and imparting oscillatory motion to the wiper arm; Fig. 10 shows the parts of mechanism in Fig. 9 combined with a wiper, and illustrating their application to a wind-shield, and Fig. 11, illustrates the same parts of mechanism and application, but with a duplicate wiper arm and wiper; Fig. 12 is a plan illustrating the device attached to a wind-shield of V-formation and Fig. 13 is a plan of the device attached to an ordinary straight wind-screen; Fig. 14 illustrates the application to the device of the flexible shaft shown in Fig. 7; Fig. 15 is an end view, in section, of a wind-shield, illustrating the use of the flexible shaft.

The gear casing which, with the wind-vane shaft A, constitutes the power-generator, comprises an outer part H comprising a base having an upstanding wall H' provided with a recess K; a bore I extending entirely through the part and bosses I' thereon, both of which are screw-threaded to accommodate a cap J.

An inner part G of the casing consists of a plate having an upstanding wall G' having a boss L and an opening N; a cover P having a screw-threaded portion P' adapted to enter the interiorly screw-threaded wall G' and thereby close the casing.

The parts G and H are united by being clamped between a shoulder N' of a pin N and a nut O, and are rendered more proof against ingress of dust by a thin plate R, secured to the part H by screws S and projecting into a groove Q (Fig. 5) in the part G.

The headed pin N retains in position the worm-wheel C meshing with a worm B, secured by a pin B' to a vane-shaft A' to which is removably secured the wind-vane A by a spring-clip T' encompassing the shaft A in a groove V (Fig. 8) a pin U (Figs. 8, 13) on a flange T entering a perforation U' in the boss of the vane, to cause the shaft to revolve with it.

The boss L has projecting from it a shaft casing F terminating in a casing W formed with a clip W' to engage over the edge of the wind-shield. A shaft F', composed of short sections f united by ball and socket joints f' within the casing F, is secured, at one end, to a head E having a slot E' and is, at its other end, formed with encompassing teeth constituting an annular toothed rack Z. The slot E' is occupied by the headed stud D projecting from the face of the worm-wheel C, and the rack is engaged by the teeth of a pinion Y journalled in the casing W, and having spindle X passing through it and provided with a knob $d$. A pin $c$ projects from the spindle X and a notch $a$ is formed in the end of the extended boss of the pinion Y. A set-screw $x$ binds an arm $b$ to the spindle Y in such manner that, by reason of its resiliency, it constantly presses a pad $P^2$ against the glass shield. In Fig. 11, is shown a second arm $b'$ depending from the spindle Y, to operate a second pad $P^2$ on the opposite side of the shield.

The part H of the gear-casing has a clip $h$ to serve as support on the wind-shield.

The operation of that form of the device described is as follows:—

The clip W', having been placed over the upper edge of the wind-shield, with the gear casing and vane at one end thereof, the nut O is loosened and the part H of the casing turned about the part G until the wind-vane faces the wind after which the nut is tightened; this movement of the part H being rendered possible notwithstanding the worm B', by the opening M' in the part G, and the sliding of the dust excluding plate R' in the groove Q. Rotation of the vane and worm and movement radially of the boss L in the opening K and worm-wheel causes the pin D to slide to-and-fro in the slot E' and reciprocate the rod F', thereby oscillating the arm $b$ and pad $P^2$, provided the knob $d$ has been pushed inwards until the pin $c$ engages in the notch $a$. Withdrawal of the pin $c$ from the notch $a$ causes the pinion Y to be rocked idly on the spindle X by the rack Z and the pad to remain stationary. In the arrangement shown in Fig. 11, engagement of the pin $c$ and notch $a$ will also bring into operation the arm $b'$ and the pad thereon. To permit of fitting the device at the right or left side of the vehicle pin B' is removed from the worm B and the shaft A reinserted so that it projects from the other side of the gear-casing; the dust-cap J being removed and fitted to the other boss I.

I claim:—

In a wind-screen wiper of the type operated by an air turbine and including a pivoted wiper, gear boxes, respectively, at the turbine and at the wiper pivot, said gear boxes connected by a rigid, jointed arm allowing the device to be mounted on an angular front windshield and allowing the two gear boxes to be mounted in different planes.

In testimony whereof I have signed my name to this specification.

FERNAN OSCAR CONILL.